Sept. 27, 1949.  H. V. SCHWANDT  2,483,326
SWINGING SAW FENCE CONSTRUCTION
Filed Feb. 19, 1947  2 Sheets-Sheet 1
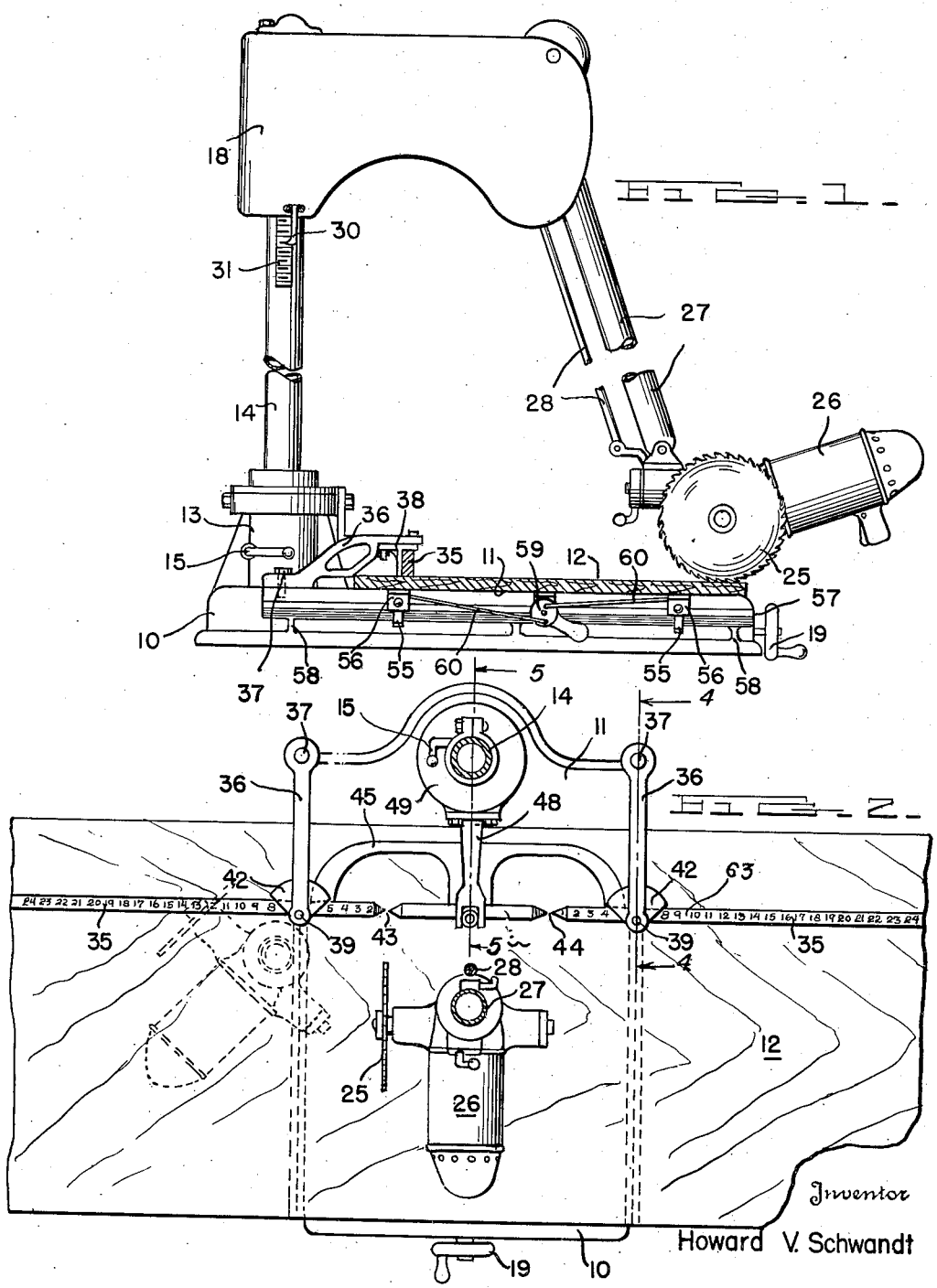
Inventor
Howard V. Schwandt
By Donald E. Lane
Attorney

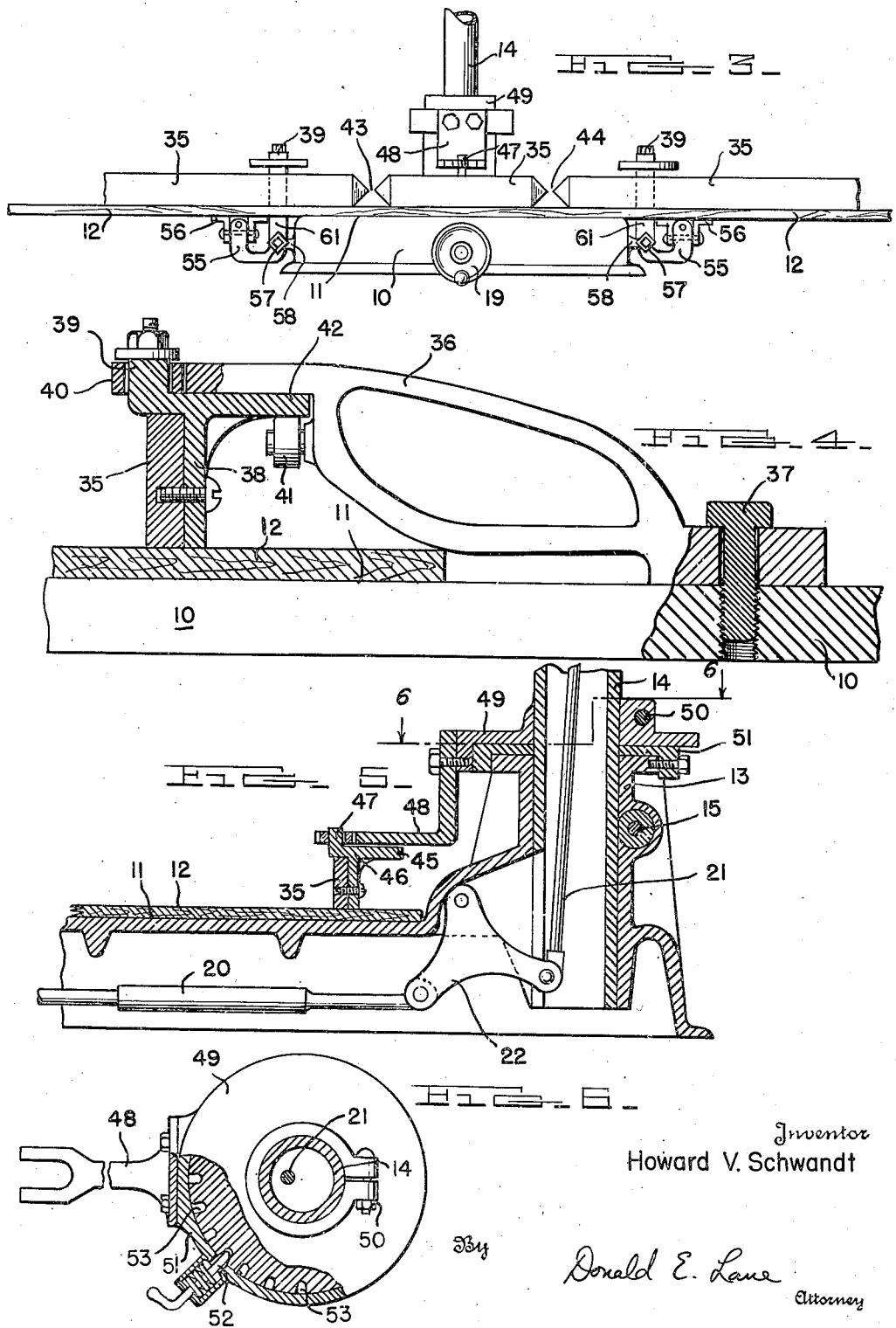

Patented Sept. 27, 1949

2,483,326

UNITED STATES PATENT OFFICE 2,483,326

SWINGING SAW FENCE CONSTRUCTION

Howard V. Schwandt, Weston, Oreg.

Application February 19, 1947, Serial No. 729,619

7 Claims. (Cl. 143—175)

This invention relates to improvements in a fence or guide construction, and more particularly to a fence or guide construction for use with power-driven swinging cut-off saws, such as, for instance, the swinging saw construction shown and described in my copending application, Serial No. 724,965, filed January 29, 1947.

The improved fence or guide construction described herein may be used for properly positioning material to be sawed on a work table, so that the material may be cross-cut at a desired angle to its length or at a desired double angle, or may be rip cut. Fences or guides heretofore provided for saws are generally rigidly secured to the work table or rigidly clamped in a desired position, and are usually subject to being damaged or cut through by careless operation of the saw. The fence construction of this invention is such that it may be used for many types of sawing operations and is supported so that it cannot be engaged or damaged by the power saw to which it is attached regardless of the sawing angle to which the saw is adjusted.

It is an object of this invention to provide a fence construction which is pivotally supported on a work table for positioning material to be cut at a desired angle by a swinging power-driven saw.

It is another object of this invention to provide a fence construction so supported with respect to a power-driven saw that the saw cannot cut or damage the fence construction.

It is another object of this invention to provide an adjustable fence construction which properly positions material to be sawed at various angles including double angles.

It is still another object of this invention to provide a novel fence construction which may be economically constructed and easily applied to swinging saw mechanisms now in use.

Numerous other objects and advantages of this invention wil be readily apparent from the following detailed description of the preferred embodiment of the invention illustrated in the accompanying drawings, wherein:

Figure 1 is a side elevational view, partly in section and partly cut away, of a fence construction embodying my invention attached to a swinging saw mechanism.

Figure 2 is a plan view of a portion of the fence and saw construction shown in Figure 1.

Figure 3 is an enlarged front elevational view illustrating the attachment of the fence construction to the base of the saw mechanism of Figures 1 and 2.

Figure 4 is an enlarged side elevational view, partly in section, taken on line 4—4 of Figure 2.

Figure 5 is another enlarged side elevational view partly in section taken on line 5—5 of Figure 2.

Figure 6 is a horizontal view, partly in section, taken on line 6—6 of Figure 5.

Referring to Figure 1, for the purposes of illustration, the saw construction is provided with a base 10, having a flat work table 11 integral therewith. A wooden top 12 of plywood or the like is clamped over the work table 11, as hereinafter described, to raise the material to be sawed above the work table 11 and to thereby prevent the saw from cutting into the surface of the table 11. The table 11 may be approximately square, and the plywood top 12 may be of considerably greater width as indicated generally in Figure 2. The base 10 is provided with an upstanding socket 13 at the rear thereof to support the vertical post or standard 14. A wedging clamp 15 is provided in the socket 13 to rigidly clamp the post 14 to the socket and base. The head member 18 is provided with a vertical bore to receive the upper end of the post 14 and is adapted to be adjusted upwardly and downwardly on the post 14 by means of the hand wheel 19, the latter being connected to the head 18 by rods 20 and 21, and lever 22, shown in Figure 5, and described more fully in my copending application heretofore mentioned. The rotary saw 25 driven by the motor 26 is supported by the swinging arm 27 and rod 28 depending from the head 18, mechanisms being provided in the head 18 to control and restrict the swinging movement of saw 25 to movement in a straight horizontal path across and parallel to the surface of work table 11. Such mechanisms and also the connections between the arm 27 and saw 25 which permit the latter to be adjusted for vertical, angular, or horizontal cutting, are shown and described in said copending application. The head 18 may be provided with a depending pointer 30 to indicate on a scale 31 on the post 14 the distance of the cutting edge of saw 25 above the table 11.

The fence construction of this invention includes a transverse guide bar 35 pivotally supported by a pair of arms 36, the latter being pivotally connected to the rear of the saw base 10. The arms 36 are mounted for pivotal movement on pins or bolts 37, the axis of each bolt 37 and the axis of the post 14 being in a single vertical plane. A bracket 38 secured to the fence bar 35 carries an upstanding pivot pin 39 with the axis of the pin in the vertical plane of the forward or contact face of the bar 35, the pin 39 being received in a bearing 40 in the forward end of the arms 36. As shown in Figure 2, the arms 36 are parallel to one another, thus assuring that the face of the bar 35 is always parallel to the vertical plane through the axis of bolts 37 and the axis of post 14. As shown in Figure 4, the arm 36 is provided with a projecting roller 41 engaging the underside of a projecting shoulder 42 of the bracket 38 to assist in maintaining the face of the bar 35 always vertical and perpendicular to the surface of the top 12 on the work table 11.

The fence or guide bar 35 is slotted at points 43 and 44 dividing the bar into three portions or sections. These sections are secured together and maintained in alinement with each other by a bracket 45. The bracket 45 may be integral with the brackets 38, or may be a separate casting secured to the rear face of each section of the bar 35 by screws or the like. The bracket 45 is shaped to provide a pocket or recess to the rear of each of points 43 and 44 where the guide bar 35 is divided in order to avoid contact with the saw 25 when the latter is swung through the slotted portion of the bar 35. The central section of the bar 35 is provided with a bracket 46 (Figure 5) secured to the bar and having an upstanding pivot 47, the vertical axis of the pivot being in the plane of the forward or contact face of the fence bar. The pivot 47 is engaged by linkage such as a slotted arm 48 extending forward from the thrust ring 49. The ring 49 is clamped rigidly to the post 14 by bolt 50 and engages a bearing washer 51 rigidly secured to the upper end of the socket 13. The ring 49 carries a spring biased detent 52 extending through the edge of the ring and shaped to cooperate with a series of notches 53 in the periphery of washer 51 as shown in Figure 6. When the wedge clamp 15 is released and the detent 52 withdrawn from a notch 53, the post 14 may be turned in socket 13 and the head member 18 and the saw 25 carried thereby may be swung to either side of the forward position shown in Figure 2, such as to the forty-five degree position shown in dotted lines in Figure 2. The ring 49 and post 14 is then held in the new position by detent 52 entering the desired notch 53 and by reclamping the post clamp 15. As the saw is swung to the desired angular position, the ring 49 moves the arm 48 through a corresponding angle thereby moving the fence bar 35 and its supporting arms 36 to properly position the slots 42 and 43 with respect to the new position of saw 25. It is to be understood that the bar 35 is shown slotted at two points 42 and 43, one on either side of the center section pivot 47, since the saw and motor unit, as more fully described in said copending application, is adapted to have the saw 25 mounted on either the left or the right side of the motor 26, for use by either left-handed or right-handed saw operators as desired. The pivots 37, 39, and 47 may be provided with ball bearings for ease of operation.

The plywood top 12 may be detachably secured to the saw base 10 by providing depending pivoted clamps 55, as shown in Figures 1 and 3. The clamps 55 are pivoted to brackets 56 secured to the underside of top 12 and have a free end which projects under the horizontal guide rails 57, there being a rail 57 on each side of the base 10 supported by rigid arms 58 extending outward and upward from the base. Between each pair of clamps 55, a clamping lever 59 is pivotally mounted on the underside of the top 12 as illustrated in Figure 1. Rods 60 extending from the operating lever 59 to each pivoted clamp serve to tilt the clamps 55 so that the projecting ends engage the underside of the rail 57. Suitable top supports 61 (Figure 3) secured to the top 12 engage the upper side of the rail 57. The rods 60 may be pivotally connected to the lever 59 so that the pivots are moved over a dead center position to hold the lever in the clamping position. The construction shown permits the top 12 and the fence construction to be quickly applied to or removed from the base 10 of the saw whenever it is desired to move the saw and its attachments to a new working location.

The fence bar 35 may have a distance scale 63 marked upon its upper edge with a zero point at each of the gaps 43 and 44. For example, the scale on the right hand section of bar 35 in Figure 2 begins with zero at the gap 44 and is marked in inches or fractions thereof from left to right. It is then possible to aline the end of material with the proper point of the scale for the length to be sawed or cut and subsequent swinging of the driven saw through the gap 44 will saw the material to the desired length. Where a number of pieces are to be successively cut by this apparatus, the fence bar 35 may be made slotted to permit a slidable stop to be clamped to the fence bar at the exact length to which the pieces are to be cut. Each piece is then laid on the top 12, pushed against the fence bar 35, and moved laterally into engagement with the clamped stop to properly position the piece for sawing. Provision may be made for extending the end sections of fence bars 35 by the addition thereto of supplementary lengths of bar, as will be readily apparent to those skilled in the art, so that long lengths of material may be measured and accurately cut.

In operation, the fence construction being connected through the bracket 48 with the standard 14 and the head 18, the slots or gaps 43 and 44 in the fence bar are automatically properly positioned to receive the saw 25 as it is swung back and forth in a straight horizontal path during sawing. The fence is so mounted that it is always parallel to the vertical plane through the pivots 37 and the axis of post 14, and the gaps in the fence are such that the saw 25 will pass through when straight cut-off, angular cut-off, or double angular cut-off sawing is done.

Obviously many variations in the nature and arrangement of the various elements described will be readily evident to those skilled in this art, and this invention contemplates any such equivalent structures within the scope of the following claims.

I claim:

1. A fence construction for use with a swinging saw supported for adjustment of the plane of swing about a vertical axis, said fence construction comprising in combination, a movable guide bar, a pair of pivotally-supported parallel arms pivotally connected to said guide bar, said guide bar being divided by a slot therethrough, a bracket bridging said slot and connecting the divided portions of said guide bar rigidly together, and a linkage pivotally connected to a portion of said guide bar and connected to the support for said swinging saw for moving said guide bar when said saw is adjusted about said vertical axis whereby said slot in said guide bar is maintained in alinement with path of swinging movement of said saw.

2. A fence construction for use with a power-driven swinging saw supported for adjustment of the plane of swing about a vertical axis for swinging movement in a selected straight horizontal path, said fence construction comprising in combination, a movable horizontal guide bar, a pair of pivotally supported parallel arms pivotally connected to said guide bar, said guide bar being divided by a slot therethrough, a bracket bridging said slot and connecting the divided portions of said guide bar together in alinement, and a linkage pivotally connected to a portion of said guide bar and connected to the support for said swinging saw for positioning said guide bar with its slot alined with the selected path of movement of said saw.

3. A fence construction for use with a power-driven swinging saw adjustably supported for adjustment of the plane of swing about a vertical axis and for swinging movement in a desired straight horizontal path, said fence construction comprising in combination, a movable horizontal guide bar, a pair of pivotally supported parallel arms pivotally connected to said guide bar, said guide bar being divided by a pair of spaced slots therethrough between the connections of said arms to said bar, a bracket bridging said slots and connecting the divided portions of said bar together in alinement, and a bracket pivotally connected to the central portion of said guide bar between said slots and connected to the support for said swinging saw for positioning said guide bar with one of its slots in alinement with the path of movement of said saw.

4. In a saw construction having a power-driven swinging saw adjustably supported over a work table for swinging movement across said table in various planes of swinging movement, a fence construction comprising in combination, a work top detachably secured to said work table, a horizontal guide bar movable on said work top, said guide bar being pivotally connected to said work table by a pair of spaced parallel arms pivotally connected to the table at one end and pivotally connected to said bar at the other end, said guide bar having a slot therethrough dividing the same, a bracket secured to the divided portions of said bar bridging said slot and maintaining said divided portions in alinement, and linkage extending between a portion of said guide bar and the support for said swinging saw for positioning said guide bar with its slot in alinement with the path of movement of said swinging saw.

5. In a swinging saw and fence construction the combination comprising, a work table, an upright post supported adjacent the rear edge of said table for angular adjustment about a vertical axis, a power-driven swinging saw supported from the upper portion of said post for swinging movement in a straight horizontal path across said work table, a horizontal guide bar extending across said work table, said guide bar being pivotally connected to said work table by a pair of spaced parallel arms of equal length, said arms having their forward ends pivotally connected to said guide bar and having their rearward ends pivotally connected to said work table with the axis of each rear pivot in a vertical plane including the axis of said upright post, said guide bar having a slot therethrough dividing the same, a bracket secured to the rearward side of the divided portions of said bar bridging said slot and maintaining the portions of said bar in straight alinement, and a bracket secured to said post and pivotally connected to a portion of said guide bar on an axis parallel to said parallel arms for positioning said guide bar with its slot in alinement with the path of movement of said saw for various angular adjustments of said post.

6. In a fence construction as set forth in claim 3, the axis of each pivotal connection between said parallel arms and said guide bar and the axis of the pivotal connection between said bracket and said guide bar being in a single vertical plane coincident with the plane of the forward face of said guide bar.

7. In a fence construction as set forth in claim 3, the slots in said guide bar being of wedge-shaped cross-section for passing said swinging saw in planes tilted from a vertical path of movement.

HOWARD V. SCHWANDT.

REFERENCES CITED

The following references are of record in the file of this patent:

UNITED STATES PATENTS

| Number | Name | Date |
| --- | --- | --- |
| 663,645 | Strait | Dec. 11, 1900 |
| 1,504,248 | Johnson | Aug. 12, 1924 |
| 2,260,421 | Tracy | Oct. 28, 1941 |